United States Patent
Feng et al.

(10) Patent No.: US 11,117,995 B2
(45) Date of Patent: Sep. 14, 2021

(54) PROCESS FOR PREPARING HIGH MELT STRENGTH POLYPROPYLENE

(71) Applicant: Formosa Plastics Corporation, USA, Livingston, NJ (US)

(72) Inventors: Chaowei Feng, Port Lavaca, TX (US); Ming-Yung Lee, Port Lavaca, TX (US); Honglan Lu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 16/110,115

(22) Filed: Aug. 23, 2018

(65) Prior Publication Data

US 2020/0062880 A1   Feb. 27, 2020

(51) Int. Cl.
| | |
|---|---|
| *C08F 255/02* | (2006.01) |
| *C08K 5/053* | (2006.01) |
| *C08K 5/11* | (2006.01) |
| *C08K 5/134* | (2006.01) |
| *C08K 5/5419* | (2006.01) |
| *C08K 5/14* | (2006.01) |

(52) U.S. Cl.
CPC ............ *C08F 255/02* (2013.01); *C08K 5/053* (2013.01); *C08K 5/11* (2013.01); *C08K 5/134* (2013.01); *C08K 5/14* (2013.01); *C08K 5/5419* (2013.01); *C08F 2500/09* (2013.01); *C08F 2500/11* (2013.01); *C08F 2500/17* (2013.01); *C08F 2800/20* (2013.01)

(58) Field of Classification Search
CPC ............... C08F 255/02; C08F 2500/09; C08F 2500/11; C08F 2500/17; C08F 2800/20; C08K 5/54; C08K 5/541; C08K 5/5419; C08K 5/5425; C08K 5/053; C08K 5/11; C08K 5/134; C08K 5/14
See application file for complete search history.

(56) References Cited

U.S. PATENT DOCUMENTS

| | | |
|---|---|---|
| 6,103,833 A | 8/2000 | Hogt et al. |
| 6,875,826 B1 | 4/2005 | Huovinen et al. |
| 7,395,740 B2 | 7/2008 | Reckhart |
| 9,074,062 B2 | 7/2015 | Satpathy et al. |
| 2004/0171712 A1 | 9/2004 | Ojeda et al. |
| 2006/0167128 A1 | 7/2006 | Olivier et al. |
| 2012/0065333 A1 | 3/2012 | Li et al. |
| 2013/0059958 A1* | 3/2013 | Satpathy .............. C08F 8/00 524/153 |
| 2013/0109820 A1 | 5/2013 | Zhang et al. |
| 2015/0376354 A1 | 12/2015 | Chen et al. |
| 2018/0051105 A1 | 2/2018 | Xu et al. |
| 2018/0066084 A1 | 3/2018 | Xu |
| 2018/0244883 A1* | 8/2018 | Zhao ................. C08J 9/0023 |
| 2018/0327520 A1 | 11/2018 | Kong et al. |
| 2019/0352439 A1 | 11/2019 | Xu et al. |

FOREIGN PATENT DOCUMENTS

| | | | |
|---|---|---|---|
| CN | 105801757 A | * | 7/2016 |
| EP | 0879830 A1 | | 11/1998 |
| EP | 0987279 A1 | | 3/2000 |
| WO | 2005/044877 A1 | | 5/2005 |

OTHER PUBLICATIONS

Kim, J.Y. et al. Fibers and Polymers vol. 4(3) pp. 107-113 (Sep. 2003).*
https://plastics.ulprospector.com/properties/ASTMD1238 (Year: 2020).*

* cited by examiner

*Primary Examiner* — Irina S Zemel
*Assistant Examiner* — Jeffrey S Lenihan
(74) *Attorney, Agent, or Firm* — Jones Walker LLP

(57) ABSTRACT

The present invention relates to a polypropylene composition comprising a long chain branched polymer having high melt strength. The process for preparing the corresponding polypropylene having composition is provided comprising blending a propylene base polymer with a unsaturated polyfunctional poly(alkylsiloxane), a polyfunctional acrylate coagent, an initiator, additives such as stabilizer, acid neutralizer and antioxidants, and reactive extruding the blend to form a branched polymer composition bridged by siloxane units.

26 Claims, 2 Drawing Sheets

PROCESS FOR PREPARING HIGH MELT STRENGTH POLYPROPYLENE

BACKGROUND

Melt strength is a vital property for polymers which impacts many extrusion processes. The melt strength determines the capability of polymer melt to maintain its shape without deformation until hardening during extrusion, injection molding, and a variety of other conversion processes. It affects the bubble stability in polymer films, wall thickness in blow molding, drawdown in extrusion coating, and orientation sag for pipe applications. Melt strength can be defined as the resistance of a polymer to external stretching in the molten state, i.e. viscoelasticity in molten state. Fundamentally, the melt strength depends on the strength of macromolecular chain entanglements and is characterized by the resistance of the entangled polymer chains to untangling under strain. Essentially, the melt strength of a polymer material can be improved by increasing the extent of chain entanglements through modifying the molecular structure to increase the molecular weight distribution, molecular branching, and blending.

Polypropylene resin exhibits many favorable properties such as high tensile strength, high modulus, good stiffness, and thermal stability, which enables its wide applications in many commercial products. However, polypropylene has intrinsically poor melt strength due to its essentially linear macromolecular structure and low level of molecular chain entanglements, which displays no strain hardening behavior and poor processability in the molten state. By comparison, low density polyethylene produced from free radical polymerization has desirable melt strength because of its non-linear molecular architecture. The low melt strength of polypropylene can cause problems such as thermoforming sag, edge weave or poor extrudability during extrusion coating, thickness irregularities in blow molding, and non-uniform cellular structures for foaming, which significantly limit their applications in many conversion processes and products. As a result, significant attention has been paid in both academia and industry to improve the melt strength of polypropylene by modifying its molecular architecture. Various methods have been developed to produce high melt strength polypropylene (HMS-PP). The preparation technologies of HMS-PP can be categorized into reactor and post-reactor approaches.

With the reactor approach, the melt strength of polypropylene can be improved by producing broad molecular weight distribution, branched molecular architecture, or incorporating comononer units in the composition during the reactor polymerization stage. The broad molecular weight distribution can be realized by using several polymerization reactors connected in series, catalyst system with special electron donors, or multiple stage polymerization. For example, U.S. Pat. No. 6,875,826 described a process to produce high melt strength polypropylene by subjecting the polymerization to a series of reactors using discrete amounts of $H_2$ as molecular weight regulator in different reactors. High molecular weight polypropylene chains and low molecular weight segments are created in different reactors respectively, thereby producing products with wide or bimodal molecular weight distribution. The high molecular weight portion enhances the melt strength of the polymer while the low molecular weight chains impart good processability to the product. On the other hand, polypropylenes with branched structure are usually produced in the presence of metallocene catalyst during propylene polymerization or copolymerization of propylene with multifunctional monomers. EP0987279 described the preparation of long chain branched, propylene-based polymers using a metallocene catalyst and an aluminoxane via the intermediate formation and subsequent polymerization of vinyl-terminated macromonomers. WO2005044877A1 illustrated a polypropylene with Y/H-shaped branch structure prepared via the copolymerization of propylene and diene in the presence of metallocene catalyst.

The reactor approach is often complicated, costly and insufficient to provide commercially desirable melt strength. As such, enhancing the melt strength of polypropylene materials after polymerization is more commonly seen. During post-reactor processing, the original linear architecture of polypropylene can be changed to a long-chain branched structure. In addition, the molecular weight or molecular weight distribution can be increased post-polymerization. Moreover, polypropylene can also be physically blended with other high melt strength materials, such as UWHDPE, to improve the properties.

As one main post-reactor modification, polypropylene long chain branches (LCB) were produced by solid state electron beam (EB) irradiation or chemical modification of polymer melt. The EB irradiation generates free radicals via chain scission which then recombine to form long-chain branched structure, such as is described in "Radiation treatment of polypropylene", Polymeric Materials Science and Engineering 67, 106, 1992. The irradiation can be conducted in a reduced oxygen environment or in the presence of air, e.g. U.S. Pat. No. 7,935,740 disclosed a process to prepare high melt strength polypropylene by irradiating the starting material under an atmosphere of reduced $O_2$, maintaining the irradiated extrudate in such environment for a specific time to generate sufficient long chain branches, and finally deactivating the macro-radicals in the extrudate. In comparison, U.S. Publ. App. 2006/0167128A1 irradiated the polypropylene pellets in presence of air to introduce branched architecture with increased melt strength. Moreover, irradiation was also carried out in the presence of crosslinking agents. U.S. Publ. App. 2004/0171712A1 reported a polypropylene copolymer grafted with high molecular weight branches by irradiating the materials under unsaturated crosslinking promoting gases. Several grades of HMS-PP developed by EB irradiation are commercially available, but the instrument to impart the irradiation is typically expensive. On the other hand, chemical modification through a direct reactive extrusion process is simple and cost effective, which has been another focus of HMS-PP inventions. Molecular branching by chemical modification is fundamentally based on a recombination reaction between reactive polypropylene and coupling agents. The reactive polypropylene can be oxidized, maleated or peroxygenated PP obtained from pretreatment while the coupling agent can be vinyl, amine, or metallic coupling compounds. The more common method is the use of peroxide as initiator and a polyfunctional monomer (PFM) as coupling agent. PP macro-radicals generated with peroxide initiate the polymerization of polyfunctional monomer to form polypropylene long chain branches. In this manner, Borealis used bifunctional unsaturated compounds such as diene, divinyl, or diallyl monomer as the crosslinking agent, as described in EP 0879830. Akzo Nobel N. V. employed peroxydicarbonate as the coupling agent as shown in U.S. Pat. No. 6,103,833. In addition, U.S. Pat. No. 9,074,062 described the use of acrylate family with different unsaturated functionalities as polyfunctional monomer. Furthermore, Fina Technology illustrated the use of acrylic monomer together with vinyl alkoxysilane compound in U.S. Publ. App. 2012/0065333A1. More recently, CN105801757A has reported the combination of vinyl silicone oil (i.e. vinyl polydimethylsiloxane) and styrene/cycloolefin in direct reactive extrusion to prepare long chain branched polypropylene.

Molecular branching using peroxide initiator and polyfunctional monomer in direct reactive extrusion has proven to be a promising and practical process to manufacture commercial high melt strength polypropylene. However, the process is subjected to several challenges. Excessive use of peroxide can cause significant chain scission or polypropylene degradation. In addition, high crosslinking degree may lead to formation of gels which adversely affect product quality. Furthermore, homopolymerization of polyfunctional monomer can occur under concentrated conditions. More importantly, hazardous compounds were largely used as coupling agents in the literature, which are difficult for large scale operation. Therefore, what is still needed is a process that is eco-friendly, efficient and economical to produce HMS-PP. Current processes primarily focus on using non-hazardous coupling compounds, optimizing process parameters, controlling the branching kinetics, and improving product qualities.

SUMMARY OF THE INVENTION

Accordingly, the present invention provides a refined process for producing a long chain branched polypropylene having high melt strength, wherein the process comprises blending a linear propylene base polymer with an unsaturated polyfunctional poly(alkylsiloxane) and a polyfunctional acrylate coagent, in the presence of an initiator and at least one additive selected from the group consisting of stabilizers, acid neutralizers, and antioxidants, and reactive extruding the blend to form a branched polymer composition bridged by siloxane units.

The linear propylene base polymer is selected from the group consisting of a polypropylene homopolymer, a polypropylene random copolymer, a polypropylene impact copolymer, and combinations thereof. Still, the propylene base polymer is selected from the group consisting of isotactic polypropylene, hemi-isotactic polypropylene, syndiotactic polypropylene, atactic polypropylene, and combinations thereof.

The unsaturated multifunctional poly(alkylsiloxane) is selected from the group consisting of vinyl terminated poly(alkylsiloxane) based homopolymer or copolymer, or combinations thereof. The molecular weight of the unsaturated poly(alkylsiloxane) is a critical parameter controlling the reaction efficiency for producing long chain branches by adjusting vinyl content in the macromolecules. Low molecular weight unsaturated poly(alkylsiloxane) with higher vinyl content can produce more long chain branches or achieve higher melt strength under same amount, thereby refining the process economy. Therefore in a preferred embodiment of the present invention, the unsaturated polyfunctional poly(alkylsiloxane) has a molecular weight in the range of about 500-50,000 g/mol or a vinyl content in the range of about 0.01-20 wt %, or more preferably molecular weight in the range of about 500-5,000 g/mol or vinyl content in the range of about 1-20 wt %, yet more preferably molecular weight in the range of about 500-2,000 g/mol or vinyl content in the range of about 3-20 wt %. In a preferred embodiment, the concentration of the unsaturated polyfunctional poly(alkylsiloxane) is in the range of about 0.05-5%, more preferably about 0.05-1%, most preferably about 0.05-0.5%, based on the weight of the propylene base polymer.

The polyfunctional acrylate coagent is selected from the group consisting of a triacrylate compound, a tetraacrylate compound, a pentaacrylate compound, or combinations thereof. In a preferred embodiment of the present invention, the polyfunctional acrylate co-crosslinker is selected from the group consisting of trimethylolpropane triacrylate (TMPTA), pentaerythritol triacrylate (PETA), hexadecylmethacrylate (HDMA), octadecylmethacrylate (ODA), butylmethacrylate (BMA) etc., and combinations thereof. Still in a preferred embodiment, the dosage of the polyfunctional acrylate coagent is in the range of about 0.01-1%, more preferably in the range of about 0.01-0.5%, most preferably in the range of about 0.01-0.1%, based on the weight of the polymer blend.

The initiator is selected from the group consisting of an organic peroxide such as benzoyl peroxide, 2,5-Dimethyl-2,5-di(tert-butylperoxy)hexane, 2,5-dimethyl-2,5-di-(tert-butylperoxy), peroxydicarbonates, dialkyl peroxides, peroxyesters, monoperoxycarbonates, diacyl peroxides, or other thermally decomposed free radical generating compound, or combinations thereof. A preferred peroxide is selected from the group consisting of benzoyl peroxide, 2,5-dimethyl-2,5-di-(tert-butylperoxy) (Triganox 101), 2,5-dimethyl-2,5-di-(tert-butylperoxy)hexane (Luprox 101), and combinations thereof. The amount of initiator used in accordance with the present invention is preferably in the range of about 10-1000 ppm, more preferably in the range of about 10-500 ppm, and most preferably in the range of about 10-50 ppm, by weight of the polymer blend.

Typical additives are selected from the group consisting of stabilizers, acid neutralizers, antioxidants, oxidants, antistatic agents, fillers, pigments, ultraviolet screening agents, ultraviolet light absorbents, fire retardants, processing oils, coloring agents, mold release agents, dyes, blowing agents, fluorescent agents, surfactants, and combinations thereof. Stabilizers or antioxidants may be utilized to protect the polymer resin from aging or degradation in end use. These additives may be included in an amount that is effective to impart desirable stabilization. In accordance with present invention, at least one antioxidant is used and selected from the group consisting of Tetrakismethylene, (3,5-di-t-butyl-4-hydroxyhydroconnamate)methane (Irganox-1010), Tris(2,4-di-t-butylphenol)phosphate (Irgafos168), Tetrakis(2,4-di-t-butylphenol-4,4'-biphenylenediphosphonite (PEPQ), or combinations thereof. Antioxidants may be used in an amount from about 0.02-20%, more preferably from about 0.05-10%, and most preferably from about 0.05-0.5%, based on the total weight of the polymeric composition.

DETAILED DESCRIPTION OF THE INVENTION

Figure 1:
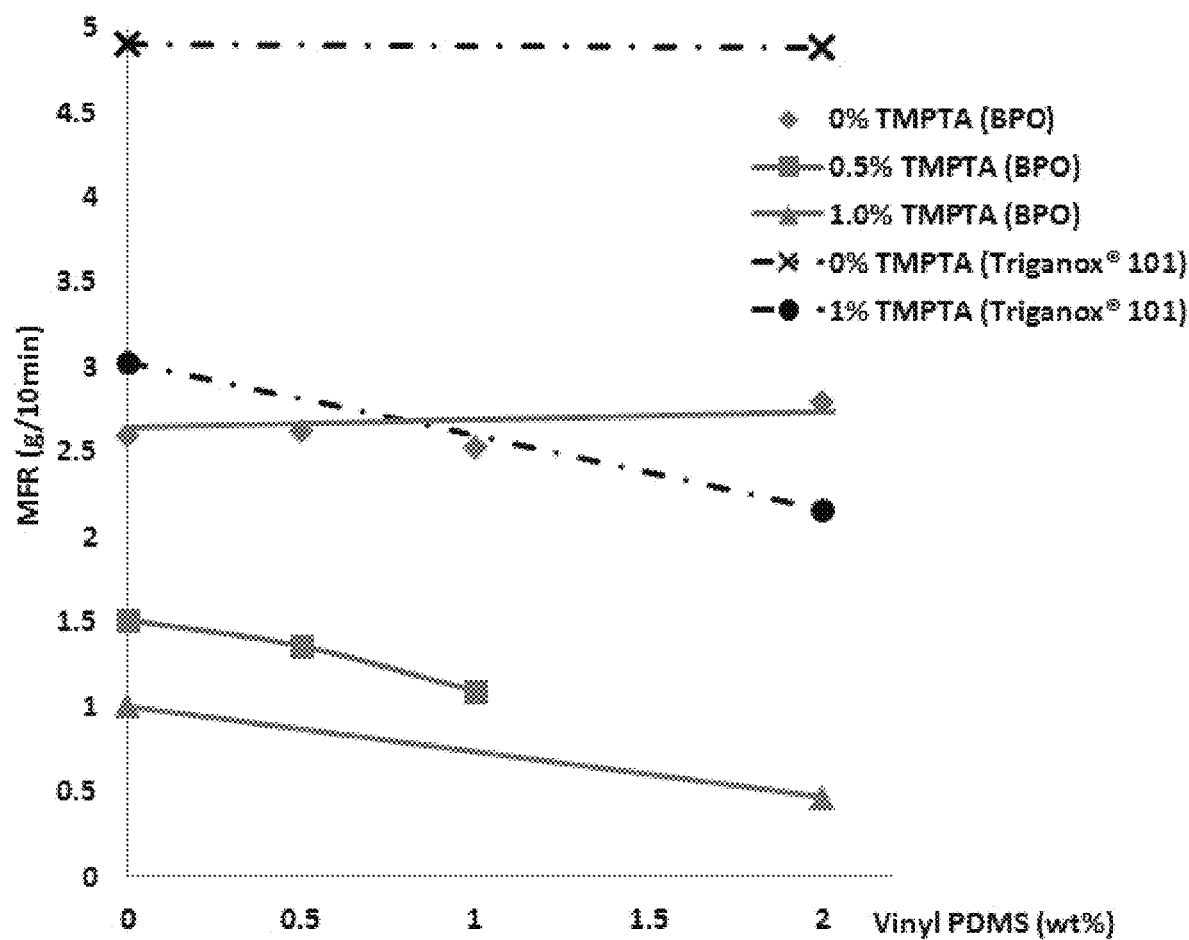
FIG. 1 demonstrates the relationship between MFR and vinyl PDMS concentration for varying concentrations of TMPTA coagent, in accordance with certain teachings of the present invention.

Polypropylene is used in a variety of commercial products and applications due to its many favorable properties. Applications such as foams or thermoformed sheets require high melt strength performance to maintain the structural integrity or dimensional stability of the products during the conversion operations. Poor melt strength can result in many processing problems for polypropylene, e.g. thermoforming sag, collapsed or non-uniform cell structures for foam. Polypropylene produced in regular processes has intrinsically linear molecular structure, leading to weak chain entanglement and low melt strength. Commercial polypropylenes with poor melt strength are not suitable for conversion operations that involve melt extension.

The melt strength performance of a polymer is dictated by the strength of chain entanglement. Modifying the molecular architecture by increasing the molecular weight or introducing long chain branches has been proven to be effective for improving the melt strength with increased entanglement level. Controlled rheology grades have long been established for commodity polypropylene. However, a new type of specialty polymer, high melt strength polypropylene (HMS-PP), was introduced into the market only from the past two decades. The HMS-PP was prepared primarily by introducing broad molecular weight distribution or long chain branched structure in either reactor or post-reactor modifications.

High melt strength polypropylene has high value potential but also high technical requirement. Disclosed herein is a refined and eco-friendly process for producing HMS-PP. A non-hazardous polyfunctional polymer is used in this invention along with small amounts of multifunctional acrylate as coupling agents with free-radical polymerization chemistry to create long chain branched polypropylene in reactive processing (also known as reactive extrusion, or reactive compounding). The current single-step process is efficient and economical with optimal process parameters, controlled reaction kinetics, and improved product qualities.

Post-reactor chemical modifications can be realized either in a batch reactor or a continuous reactive extrusion process. Modification using a batch reactor is discontinuous and therefore not practical for large scale preparation. On the other hand, reactive extrusion can realize continuous chemical modification of raw polymers in melt state for efficient scale up production of HMS-PP. For example, reactive extrusion has already been developed for controlled rheology, chain functionalization, grafting, and crosslinking.

Different chemistry has been introduced for molecular branching of polypropylene such as maleation and ionic coupling. However, many methods involve complicated pretreatment steps or use of solvent for the coupling reaction. In this context, the chemistry of free radical polymerization is more favored because initiation and crosslinking can occur simultaneously by single extrusion in the melt state without using solvent. Also, the free radical reaction can proceed under a common air atmosphere as well as a nitrogen blanket. The initiator, generally peroxide, activates the C—H bonds to generate polypropylene macro-radicals which subsequently polymerize the polyfunctional monomer, leading to formation of long chain branched structure. However, apart from the branching reaction, side reactions can occur simultaneously, including polypropylene chain fragmentation caused by excess peroxide and self-polymerization or formation of gels due to excessive use of monomers. Therefore, in order to minimize side reactions and improve the qualities of end products, the processing parameters need to be optimized during the reactive compounding to control kinetics of the competing reactions.

Various polyfunctional monomers (PFM) can be used for molecular branching, including diene, divinyl, diallyl, peroxydicarbonate, or multifunctional acrylate compounds. However, the monomers generally used are hazardous compounds which are not practical for large scale operations. It was discovered in the present invention that a non-hazardous polyfunctional poly(alkylsiloxane) can be utilized as a suitable coupling agent along with small amounts of peroxide initiator and multifunctional acrylate coagent to modify the base polyolefin (e.g. propylene homopolymer, random copolymer, or impact copolymer) via free radical chemistry in the presence of additives such as a stabilizer, acid neutralizer, or antioxidants. The branching reaction can proceed in a simple single-step reactive extrusion process in bulk melt phase under solvent or diluent free conditions. This process is simple and eco-friendly through the use of non-hazardous compound one step processing. Systematical characterizations and analysis indicate that polypropylene long chain branches were generated according to certain teachings of the present invention by using the polyfunctional poly(alkylsiloxane) to modify a linear propylene polymer. In addition, melt rheological characteristics of the resulting long chain branched polypropylene were studied under shear and extensional deformations. The polymer product demonstrated increased melt strength. Significantly, in the presence of small amounts of multifunctional acrylate coagent (e.g. 200-2000 ppm), small amounts of polyfunctional unsaturated poly(alkylsiloxane) (e.g. 1000-5000 ppm) is sufficient to realize dramatic improvement in rheological properties or melt strength of modified polypropylene using trace amounts of peroxide (e.g. 10-50 ppm), thereby achieving good process efficiency and economy of present invention. Furthermore, the concentrations of peroxide and coupling agents need to be carefully controlled to optimize the melt strength and other relevant properties, while minimizing polypropylene degradation, homopolymerization, and gel formations. Preferably, the reactively extruded polypropylene composition can exhibit improved melt strength without or with minimal undesirable degradation (i.e. indicated through an increase in melt flow index), homopolymer or gel impurities derived from the coupling compounds. This was realized in the present invention with the minimal use of peroxide (e.g. 10-50 ppm) and coupling compounds (e.g. 500-5000 ppm unsaturated poly(alkylsiloxane) & 100-2000 ppm multifunctional acrylate). Therefore, the processing parameters in the present invention are optimized to control the reaction kinetics for improving melt rheological characteristics while maintaining good end product qualities.

Elongational viscosity of polymer melts is a vital property for many conversion processes such as foaming, thermoforming, extrusion coating, or blow molding. During these processing operations, polymer melt undergoes strong expansions which involve both elongational and shear deformations. The elongational viscosity as well as shear viscosity maintains the structural integrity of polymer melts during the conversion operations. One of the primary uses of the polymer compositions prepared in present invention is to manufacture polypropylene foams with smooth foam skin and uniform foam cells. Low density polyethylene (LDPE) produced from free radical polymerization exhibits good elongational viscosity and strain hardening behavior under uniaxial or biaxial melt expansion. It can be processed at relatively high elongation deformation rates in many conversion operations. It has been established that the strain hardening behavior of LDPE is fundamentally caused by the long chain branches in its non-linear molecular architecture. On the other hand, short chain branched polyethylene or linear polypropylene display poor strain hardening or melt strength in molten state due to low level of chain entanglements. Strain hardening can be a sensitive indicator of structural characteristics of polyolefin chains. It can induce a self-healing effect to protect the structural integrity of polymer melts under expansion deformations. Poor strain hardening or melt strength of polypropylene can cause problems including thermoforming sag, edge weave of extrusion coating, thickness irregularities in blow molding, and non-uniform foam cells. The market needs of more high quality products have induced a growing urgency to enhance the melt strength of polypropylene. Many studies have been carried out to modify the PP molecular architecture by reactor and post-reactor process. However, it is rather challenging to find a simple and effective way to produce high melt strength polypropylene. In this context, current invention presents an efficient, eco-friendly and economical process to prepare long chain branched polypropylene through reactive extrusion of trace amount of peroxide, non-hazardous polyfunctional unsaturated poly(alkylsiloxane) and small amount of multifunctional acrylate in presence of other additives such as neutralizers and antioxidants.

In a preferred embodiment of the present invention, the propylene base polymers for use may be selected from propylene homopolymers, random copolymers, or more preferably heterophasic block copolymers.

If used, the propylene copolymers may preferably be selected from a random copolymer or an impact block copolymer. Preferably, the copolymers may contain at least 40% w/w propylene in combination with $C_2$-$C_{20}$ alphaolefin. Preferred alpha-olefins in such copolymers may include ethylene, 1-butene, methyl-1-butenes, 1-pentene, methyl-1-pentenes, 1-hexene, 1-octene, 1-decene, or combinations thereof. In a preferred embodiment, the alphaolefin content may be in the range of about 0.1-40% w/w. Yet more preferably, the alpha-olefin content may be in the range of about 1-30% w/w.

The heterophasic block copolymers contain at least two distinct blocks of different compositions. The constituent blocks are comprised of a propylene homopolymer and a segment from at least one of the alpha-olefins mentioned above. The copolymers comprised of propylene and alphaolefin blocks may be prepared via polymerization in at least two reactors connected in series where the distinct blocks are produced consecutively.

In another embodiment, the propylene base polymer may be selected from the group consisting of isotactic polypropylene, hemi-isotactic polypropylene, syndiotactic polypropylene, atactic polypropylene, and combinations thereof.

In a preferred embodiment of the present invention, the unsaturated polyfunctional poly(alkylsiloxane) may be selected from the group consisting of vinyl terminated poly(alkylsiloxane) based homopolymer or copolymer. The concentration of unsaturated polyfunctional poly(alkylsiloxane) is preferably in the range of 0.05-5%, more preferably 0.05-1%, and most preferably 0.05-0.5%, based on the weight of the propylene base polymer.

The molecular weight of the unsaturated poly(alkylsiloxane) is a critical parameter controlling the reaction efficiency for producing long chain branches by adjusting vinyl content in the macromolecules. Low molecular weight unsaturated poly(alkylsiloxane) with higher vinyl content can produce more long chain branches or achieve higher melt strength under same amount, thereby realizing better process economy. Preferably, the unsaturated polyfunctional poly(alkylsiloxane) used in current invention has a molecular weight in the range of 500-50,000 g/mol or vinyl content in the range of 0.01-20 wt %, or more preferably the molecular weight is in the range of 500-5,000 g/mol or vinyl content in the range of 1-20 wt %, or most preferably the molecular weight is in the range of 500-2,000 g/mol or vinyl content in the range of 3-20 wt %. In accordance with present invention, it was discovered that 0.05-0.5 wt % of the unsaturated poly(alkylsiloxane) having Mn=500-2,000 g/mol is sufficiently effective to achieve a desirable MFR or melt strength in the presence of multifunctional acrylate (0.01-0.1 wt %) and peroxide (10-50 ppm) via melt polymerization in the reactive extrusion process.

Preferably, the multifunctional acrylate coagent may be selected from the group consisting of a triacrylate compound, a tetraacrylate compound, a pentaacrylate compound, and combinations thereof. The acrylate coagents can be selected from, for example, trimethylolpropane triacrylate (TMPTA), pentaerythritol triacrylate (PETA), octadecylmethacrylate (ODA), hexadecylmethacrylate (HDMA), butylmethacrylate (BMA), etc.

The dosage of multifunctional acrylate may be used in the range of 0.01-%, more preferably in the range of 0.01-0.5%, and most preferably in the range of 0.01-0.1%, based on the weight of the propylene base polymer. It was observed that 0.01-0.1 wt % of the acrylate was effective to obtain a desirable MFR or melt strength in presence of unsaturated poly(alkylsiloxane) (0.05-0.5 wt %, Mn=500-2,000 g/mol) and peroxide (10-50 ppm).

Initiators suitable for use in the present invention include, but are not limited to, benzoyl peroxide, 2,5-Dimethyl-2,5-di(tert-butylperoxy)hexane, 2,5-dimethyl-2,5-di-(tert-butylperoxy), peroxydicarbonates, dialkyl peroxides, peroxyesters, monoperoxycarbonates, diacyl peroxides, or any other thermally decomposed free radical generating compounds, or combinations thereof. In a preferred embodiment, the initiator is selected from the group consisting of benzoyl peroxide, 2,5-dimethyl-2,5-di-(tert-butylperoxy) (Triganox 101), 2,5-dimethyl-2,5-di-(tert-butylperoxy) hexane (Luprox 101), or combinations thereof. Preferably, the amount of initiator used in accordance with the present invention is in the range of 10-1000 ppm, more preferably in the range of 10-500 ppm, yet more preferably in the range of 10-50 ppm, based on the weight of the propylene base polymer.

Stabilizers or antioxidants may be utilized to protect the polymer resin from aging or degradation in end use. These additives may be included in an amount that is effective to impart desirable stabilization. Effective stabilizer concentration and method to include these additives to the reactant composition can be determined by one ordinary skill in the art with the aid of this disclosure. Preferably, the antioxidants may be used in an amount from 0.02-20%, more preferably from 0.05-10%, and most preferably from 0.05-0.5%, based on the total weight of the polymeric composition. Preferably, the stabilizers or antioxidants are selected from the group consisting of tetrakismethylene(3,5-di-t-butyl-4-hydroxyhydroconnamate)methane (Irganox-1010), tris(2,4-di-t-butylphenol)phosphate (Irgafos-168), tetrakis (2,4-di-t-butylphenol-4,4'-biphenylenediphosphonite (PEPQ), and combinations thereof.

Other additives can also be included in the modification composition to achieve other desirable properties in end products. Such additives may be selected from the group consisting of acid neutralizers, oxidants, antistatic agents, fillers, pigments, ultraviolet screening agents, ultraviolet light absorbents, fire retardants, processing oils, coloring agents, mold release agents, dyes, blowing agents, fluorescent agents, surfactants, and combinations thereof.

In accordance with certain teachings of the present invention, high melt strength polypropylene (HMS-PP) is prepared by dry blending a propylene base polymer with a unsaturated polyfunctional poly(alkylsiloxane) (i.e., branching agent), a multifunctional acrylate (i.e., coagent), a free radical initiator, and at least one additive elected from stabilizer, acid neutralizer, and antioxidants. The polymer blends is then subjected to a single-step reactive extrusion process wherein the mixture is fed into an extruder, melted, and reacted inside the extruder. A single screw extruder or a co-rotating intermeshing twin screw extruder may be employed to implement this reactive modification process for melting, mixing and reacting the components. Reaction conditions can be adjusted as is known to one of ordinary skill in the art with the aid of this disclosure, including the extruder temperature for each zone, screw rotating rate, concentration of peroxide initiator, branching agent, and coagent. These processing parameters should be optimized to control the balance of reaction kinetics in order to realize efficient branching and process economy, as well as to improve product quality. The extrudate is cooled and pelletized after extrusion. The resulting long chain branched polypropylene with high melt strength may be used to mold an article for end application like foam.

In one embodiment of the present invention, the melt flow rate (MFR) of the resulting HMS-PP is reduced compared to the linear propylene base polymers. MFR, as defined herein, refers to the quantity of polymer melt flowing through an orifice at a specified temperature under a specified load. The MFR may be measured using a melt flow apparatus that extrudes polypropylene through an orifice of specified dimensions at a temperature of 230° C. and a load of 2.16 kg in accordance with ASTM D1238. The MFR may be reduced from 1-99%, alternatively from 10-90%, alternatively from 20-80%, alternatively from 30-60%, when compared to polypropylene base polymer. In a preferred embodiment of the present invention, an HMS-PP has a melt flow rate (MFR) of from 0.1 to 25 g/10 min, preferably from 0.3 to 10 g/10 min, more preferably from 0.5 to 5 g/10 min, and most preferably from 0.5 to 2 g/10 min. The reduced melt flow rate is an indicator of increased melt strength for long chain branched PP.

In the reactive compounding of the present invention, the individual ingredients are combined in a mechanical mixer or extruder which was heated to a temperature sufficient to melt the components and for the branching reaction to proceed. The blended mixture was heated to a temperature above about 150° C. and below about 300° C., preferably above about 180° C. and below about 270° C., and more preferably above about 200° C. and below about 250° C.

The reaction mixture so prepared is kneaded and extruded using an extruder having an L/D ratio as 20:1 to 50:1. The retention time of the molten mass going from the feeder to the die in the barrel is adjusted by selecting a suitable screw rotation rate. Suitable retention time is selected based on the reaction kinetics which depends on the L/D ratio and temperature of the extruder, type and concentration of reactants used for the reactive branching. The screw rotation rate was set in a way that the molten mass of the mixture takes about 1 to 100 sec, preferably 3 to 50 sec, to travel through the extruder barrel. Feeding of the reactant mixture may be conducted with or without nitrogen blanketing in the hopper through the extruder. Strand die suitable for producing one or more strands, auxiliary devices to cool the extrudate, and a mechanical pelletizer were used to obtain granulated pellets of the reactively modified polypropylene composition.

The propylene base polymer was dry contacted with the poly(alkylsiloxane) branching agent, acrylate coagent, and peroxide initiator at ambient temperature in the presence of other additives prior to thermal reaction in the extruder. The present process of using a mixture of a unsaturated polyfunctional poly(alkylsiloxane) and a multifunctional acrylate preferably from the acrylate family possessing three or more unsaturated functionalities, such as trimethylolpropane triacrylate (TMPTA) or pentaerythritol triacrylate (PETA), together with a peroxide to modify a linear propylene base polymer, does not require a pretreatment or preheating step above room temperature. The ambient temperature mixed blend is directly fed into the extruder for reactive modification to achieve desirable rheological characteristics like melt strength. Therefore, the process in the present invention is refined and simple for practical large scale modification. The dosage of unsaturated polyfunctional poly(alkylsiloxane) is preferably in the range of 0.05-5%, more preferably 0.05-1%, and most preferably 0.05-0.5%, based on the weight of the propylene base polymer. Preferably, the concentration of multifunctional acrylate is in the range of 0.01-1%, more preferably in the range of 0.01-0.5%, and most preferably in the range of 0.01-0.1%, based on the weight of the propylene base polymer. In addition, the amount of initiator is preferably in the range of 10-1000 ppm, more preferably in the range of 10-500 ppm, and most preferably in the range of 10-50 ppm, based on the weight of the propylene base polymer.

The HMS-PP produced in accordance with this invention can be further converted into molded articles for end applications, such as polypropylene quality foam. The foamed article made from HMS-PP in current process may have smooth foam skin and uniform cell structures.

EXAMPLES

The details of the invention will further be explained by way of examples which do not limit the scope of invention. Each component in the formulations as shown in the examples are given in ppm or percentage by weight unless otherwise specified.

Formulation: Polypropylene homopolymer (i.e. HPP), benzoyl peroxide (i.e. BPO), 2,5-Dimethyl-2,5-di(tert-butylperoxy) hexane (i.e. Triganox® 101), vinyl terminated poly(dimethylsiloxane) (i.e. vinyl PDMS, Mw=25,000 g/mol), trimethylolpropane triacrylate (i.e. TMPTA), DHT-4V (i.e. neutralizer), and B215 (i.e. antioxidant).

Procedure

DHT-4V (300 ppm based on the total mixture for reactive modification) and B215 (1500 ppm based on the total mixture for reactive modification) were added and mixed uniformly with polypropylene homopolymer resin. The mixture was blended with variable concentrations of vinyl poly(dimethylsiloxane) (i.e. termed as branching agent), trimethylolpropane triacrylate (i.e. termed as coagent), and either benzoyl peroxide or 2,5-dimethyl-2,5-di(tert-butylperoxy) hexane (i.e. termed as initiator) to form a blended composition. In a subsequent step, proper hand mixing operation was repeated for several times to obtain uniformly dispersed reactants and additives. The blended compositions were subsequently transferred to the hopper of a lab model extruder for the reactive modification. The processing parameters of the extruder were optimized as shown in Table 1. Finally, the modified extrudate was cooled and palletized.

TABLE 1

Process parameters for the reactive extrusion

| Screw rate (rpm) | Zone 2 (T/° C.) | Zone 3 (T/° C.) | Zone 4-9 (T/° C.) | Zone 10 (T/° C.) | Die (T/° C.) |
|---|---|---|---|---|---|
| 100 | 200 | 220 | 240 | 230 | 220 |

Results

Figure 2:
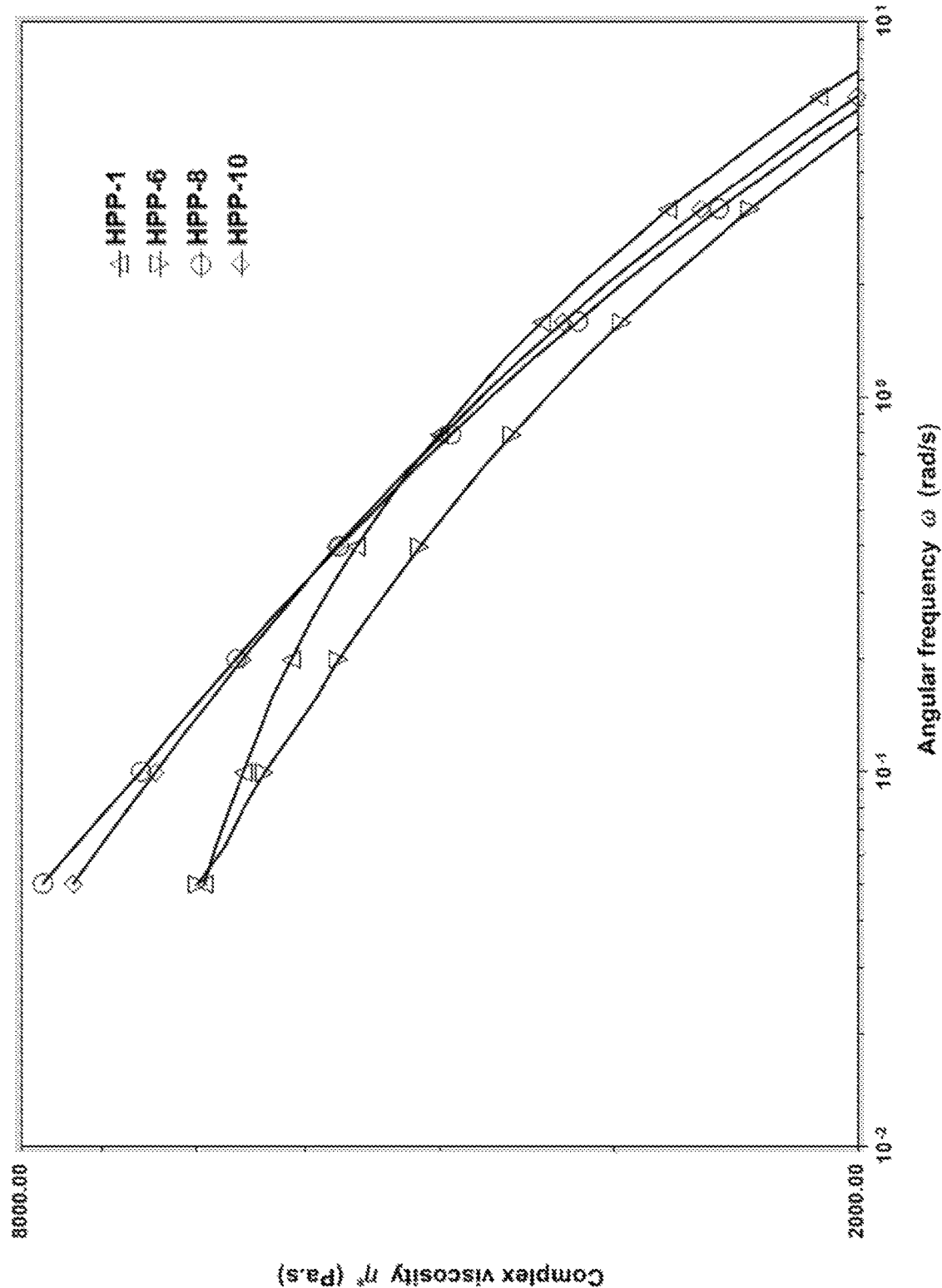
FIG. 2 plots zero-shear viscosity $\eta_0$ versus angular frequency for four HPP resins of the present invention.

In this example, the modified resins were characterized and analyzed by MFR, GPC, and melt rheological properties as summarized in Table 2. It is generally known that MFR decreases and melt viscosity increases after forming long chain branched structure, so MFR and zero-shear viscosity $\eta_0$ are used to characterize the product. It was revealed in this invention that vinyl poly(dimethylsiloxane) (i.e. branching agent) together with trimethylolpropane triacrylate (i.e. coagent) can cause crosslinking or branching of polypropylene in the presence of a peroxide initiator (i.e. benzoyl peroxide or 2,5-dimethyl-2,5-di(tert-butylperoxy) hexane), which was demonstrated by a decreasing trend of MFR and an increasing trend of melt viscosity with increasing either vinyl PDMS or TMPTA dosage keeping other variables constant (i.e. HPP-6 to HPP-9, Table 2). For example, HPP-6 modified using vinyl PDMS and TMPTA has lower MFR (i.e. 1.59 vs 2.12 g/10 m) and higher zero-shear viscosity $\eta_0$ (i.e. 8252 vs 7416 Pa*s) compared to the base resin HPP-1 (Table 2 and FIG. 2). Also, by increasing vinyl PDMS and TMPTA amount, HPP-8 shows reduced MFR (i.e. 1.09 vs 1.59 g/10 m) and increased $\eta_0$ (i.e. 13747 vs 8252 Pa*s) than HPP-6 (Table 2 and FIG. 2). Furthermore, GPC analysis shows that molecular weights (i.e. $M_n$, $M_w$) and $M_w/M_n$ reduced slightly for HPP-6 and HPP-8 compared to base resin HPP-1 (Table 2). In LCB GPC analysis, HPP-6 and HPP-8 deviates from the linear rheological relationship (i.e. intrinsic viscosity versus molecular weight) at high MW region, confirming the formation of long chain branched structure.

However, when vinyl poly(dimethylsiloxane) was used with peroxide alone in the absence of trimethylolpropane triacrylate, the branching of polypropylene did not occur as no decreasing trend of MFR was conceived (i.e. HPP-3 to HPP-5, Table 2). For instance, HPP-3 to HPP-5 has similar MFR (i.e. around 2.6 g/10 m) compared to the control sample HPP-2 which has no vinyl PDMS (Table 2). Presumably, trimethylolpropane triacrylate may function as a radical bridge for the polypropylene macro-radicals generated by peroxide to initiate the polymerization of vinyl poly(dimethylsiloxane). Without trimethylolpropane triacrylate, PP macro-radicals may be difficult to attack the vinyl groups on poly(dimethylsiloxane) directly due to strong steric hindrance of the macromolecuels. In addition, adding vinyl PDMS can improve the molecular branching compared to using TMPTA alone (i.e. HPP-10 to HPP-11, Table 2). As an illustration, with 1% vinyl PDMS, HPP-8 exhibits lower MFR (i.e. 1.09 vs 1.51 g/10 m) and higher $\eta_0$ (i.e. 13747 vs 11697 Pa*s) than HPP-10 that uses 0.5% TMPTA alone (Table 2 and FIG. 2). Moreover, the amount of 2,5-dimethyl-2,5-di(tert-butylperoxy) hexane must be carefully controlled because excessive use of this peroxide can cause significant chain scission or degradation as indicated by a substantial increase in MFR which is detrimental to materials properties while insufficient amount of it cannot lead to effective initiation and branching (i.e. HPP-12 to HPP-16, Table 2).

In summary, vinyl PDMS and peroxide can initiate molecular branching of PP in presence of TMPTA to produce long chain branched polypropylene. This was corroborated by MFR analysis as illustrated in FIG. 1. With 0.5% or 1% TMPTA co-crosslinker, MFR decreases with increasing vinyl PDMS concentration which indicates more efficient formation of LCB structure (FIG. 1). On the other hand, MFR almost does not change with increasing vinyl PDMS dosage in the absence of TMPTA, suggesting that no branching or crosslinking occurs (FIG. 1).

TABLE 2

Formulation and properties of modified polypropylene

| | Initiator | | Compound | | | | | | | | |
| | | | Compound A | | | | | | | | |
| | Peroxide A BPO | Peroxide B Triganox101 | Vinyl PDMS (Mw = 25,000 g/mol) | | Compound B TMPTA | | MFR | Mn | Mw | Mw/Mn | $\eta_0$ |
| Sample | (ppm) | (ppm) | (wt %) | (mol * 10³) | (wt %) | (mol * 10³) | (g/10 min) | (g/mol) | (g/mol) | | (Pa * s) |
| HPP-1 | 0 | 0 | 0 | 0 | 0 | 0 | 2.12 | 65927 | 364809 | 5.53 | 7416 |
| HPP-2 | 500 | 0 | 0 | 0 | 0 | 0 | 2.60 | — | — | — | — |
| HPP-3 | 500 | 0 | 0.5 | 0.05 | 0 | 0 | 2.62 | — | — | — | — |
| HPP-4 | 500 | 0 | 1.0 | 0.09 | 0 | 0 | 2.52 | 64970 | 334961 | 5.16 | 4509 |
| HPP-5 | 500 | 0 | 2.0 | 0.18 | 0 | 0 | 2.79 | — | — | — | — |
| HPP-6 | 500 | 0 | 0.5 | 0.05 | 0.2 | 1.5 | 1.59 | 64248 | 345613 | 5.38 | 8252 |
| HPP-7 | 500 | 0 | 0.5 | 0.05 | 0.5 | 3.8 | 1.36 | — | — | — | — |
| HPP-8 | 500 | 0 | 1.0 | 0.09 | 0.5 | 3.8 | 1.09 | 61649 | 321890 | 5.22 | 13747 |
| HPP-9 | 500 | 0 | 2.0 | 0.18 | 1.0 | 7.7 | 0.47 | — | — | — | — |
| HPP-10 | 500 | 0 | 0 | 0 | 0.5 | 3.8 | 1.51 | 63342 | 337154 | 5.32 | 11697 |
| HPP-11 | 500 | 0 | 0 | 0 | 1.0 | 7.7 | 1.00 | — | — | — | — |
| HPP-12 | 0 | 100 | 0 | 0 | 0 | 0 | 4.90 | — | — | — | — |
| HPP-13 | 0 | 100 | 2 | 0.18 | 0 | 0 | 4.88 | — | — | — | — |
| HPP-14 | 0 | 100 | 2 | 0.18 | 1 | 7.7 | 2.16 | — | — | — | — |
| HPP-15 | 0 | 100 | 0 | 0 | 1 | 7.7 | 3.03 | — | — | — | — |
| HPP-16 | 0 | 26 | 0.5 | 0.05 | 0.5 | 3.8 | 2.11 | — | — | — | — |

Each formulation includes 300 ppm DHT-4V neutralizer and 1500 ppm B215 antioxidant.

The results from MFR, GPC and melt rheology analysis were conclusive to corroborate the formation of long chain branched polypropylene and increase of melt strength. Vinyl poly(dimethylsiloxane) and trimethylolpropane triacrylate used together has better crosslinking or branching performance than using vinyl PDMS or TMPTA alone. Therefore, non-hazardous vinyl PDMS can be used to significantly reduce the amount or substitute the weak hazardous TMPTA.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

What is claimed is:

1. A method for producing a long chain branched polypropylene having high melt strength, comprising:
   dry blending an extrusion feed, wherein the extrusion feed comprises a propylene base polymer, a branching agent comprising an unsaturated polyfunctional poly(alkylsiloxane), a polyfunctional acrylate, and an initiator; and
   reactive extruding the extrusion feed to form a long chain branched polypropylene having a melt flow rate of 0.1-25 g/10 min (measured at a temperature of 230° C. and a load of 2.16 kg in accordance with ASTM D1238);
   wherein the unsaturated polyfunctional poly(alkylsiloxane) is a vinyl terminated poly(alkylsiloxane) based homopolymer or copolymer with a molecular weight (Mw) in the range of 500-50,000 g/mol or a vinyl content in the range of 0.01-20 wt%.

2. The method of claim 1, wherein the long chain branched polypropylene comprises a branched polymer bridged by siloxane units.

3. The method of claim 1, wherein the long chain branched polypropylene has a zero shear viscosity ($\eta_0$) of 500-200,000 Pa*s.

4. The method of claim 1, wherein the dry blending is conducted at ambient temperature.

5. The method of claim 1, wherein the vinyl terminated poly(alkylsiloxane) based homopolymer or copolymer has a molecular weight (Mw) in the range of 500-5,000 g/mol or vinyl content in the range of 1-20 wt%.

6. The method of claim 1, wherein the vinyl terminated poly(alkylsiloxane) based homopolymer or copolymer has a molecular weight (Mw) in the range of 500-2,000 g/mol or vinyl content in the range of 3-20 wt%.

7. The method of claim 1, wherein the concentration of the unsaturated polyfunctional poly(alkylsiloxane) is in the range of 0.05-5% based on the weight of the propylene base polymer.

8. The method of claim 1, wherein the concentration of the unsaturated polyfunctional poly(alkylsiloxane) is in the range of 0.05-1% based on the weight of the propylene base polymer.

9. The method of claim 1, wherein the concentration of the unsaturated polyfunctional poly(alkylsiloxane) is in the range of 0.05-0.5% based on the weight of the propylene base polymer.

10. The method of claim 1 wherein the polyfunctional acrylate is selected from the group consisting of a triacrylate compound, a tetraacrylate compound, a pentaacrylate compound, and combinations thereof.

11. The method of claim 1, wherein the polyfunctional acrylate is selected from trimethylolpropane triacrylate (TMPTA), pentaerythritol triacrylate (PETA), octadecylmethacrylate (ODA), hexadecylmethacrylate (HDMA), and butylmethacrylate (BMA).

12. The method of claim 1 wherein the concentration of polyfunctional acrylate is in the range of 0.01-1% based on the weight of the propylene base polymer.

13. The method of claim 1 wherein the concentration of polyfunctional acrylate is in the range of 0.01-0.5% based on the weight of the propylene base polymer.

14. The method of claim 1 wherein the concentration of polyfunctional acrylate is in the range of 0.01-0.1% based on the weight of the propylene base polymer.

15. The method of claim 1, wherein the initiator is an organic peroxide.

16. The method of claim 15, wherein the organic peroxide is selected from the group consisting of benzoyl peroxide, 2,5-Dimethyl-2,5-di(tert-butylperoxy)hexane, dialkyl peroxides, diacyl peroxides, hydroperoxides, peroxyacids, peroxyesters, peroxyketals, ketone peroxides, peroxycarbonates, peroxydicarbonates, tert-butyl peroxybenzoate, di(dodecanoyl) peroxide, 1,1-bis(tert-butylperoxy)cyclohexane, and combinations thereof.

17. The method of claim 1, wherein the concentration of initiator is in the range of 10-1000 ppm based on the weight of the propylene base polymer.

18. The method of claim 1, wherein the concentration of initiator is in the range of 10-500 ppm based on the weight of the propylene base polymer.

19. The method of claim 1, wherein the concentration of initiator is in the range of 10-50 ppm based on the weight of the propylene base polymer.

20. The method of claim 1, wherein the propylene base polymer is selected from the group consisting of a polypropylene homopolymer, a polypropylene random copolymer, a polypropylene impact copolymer, and combinations thereof.

21. The method of claim 1, wherein the propylene base polymer is selected from the group consisting of isotactic polypropylene, hemi-isotactic polypropylene, syndiotactic polypropylene, atactic polypropylene, and combinations thereof.

22. The method of claim 1, wherein the extrusion feed further comprises at least one additive selected from the group consisting of stabilizers or antioxidants, acid neutralizers, antiblock agents, antistatic agents, nucleators, clarifiers, fillers, slip agents, pigments, ultraviolet stabilizers, fire retardants, processing oils, mold release agents, dyes, blowing agents, fluorescent agents, surfactants, and combinations thereof.

23. The method of claim 22, wherein the stabilizers or antioxidants are selected from the group consisting of pentaerythritol tetrakis(3-(3,5-di-tert-butyl-4-hydroxyphenyl)propionate), 3,3',3",5,5',5"-hexa-tert-butyl-a,a',a"-(mesitylene-2,4,6-triyl)tri-p-cresol, 1,3,5Tris(3,5-di-tert-butyl-4-hydroxybenzyl)-1,3,5-triazine-2,4,6(1H,3H,5H)-trione, octadecyl-3-(3,5-di-tert.-butyl-4-hydroxyphenyl)-propionate, bis(2-4-dicumylphenyl)pentaerythritol diphosphate, tris(2,4-di-tert.-butylphenyl)phosphite, 3,9-bis(2,4-di-tert-butylphenoxy)-2,4,8,10-tetraoxa-3,9-diphosphaspiro [5.5] undecane, and combinations thereof.

24. The method of claim 22 wherein the concentration of the stabilizers or antioxidants is in the range of 0.02-20% based on the total weight of the polymeric composition.

25. The method of claim 22 wherein the concentration of the stabilizers or antioxidants is in the range of 0.05-10% based on the total weight of the polymeric composition.

26. The method of claim 22 wherein the concentration of the stabilizers or antioxidants is in the range of 0.05-0.5% based on the total weight of the polymeric composition.

* * * * *